Patented Feb. 13, 1940

2,189,809

UNITED STATES PATENT OFFICE 2,189,809

ALKYL ESTERS OF HYDROHALIDES OF METHYL-HYDRASTEINE AND PROCESSES FOR PRODUCING THE SAME

Carl R. Addinall, Westfield, and Randolph T. Major, Plainfield, N. J., assignors to Merck & Co., Inc., Rahway, N. J., a corporation of New Jersey No Drawing. Original application May 17, 1934, Serial No. 726,122. Divided and this application March 6, 1937, Serial No. 129,350

5 Claims. (Cl. 260—338)

This is a division of our application Serial No. 726,122, filed May 17, 1934.

The present invention relates to the production of a new series of hydrohalides of various alkyl esters of certain iso-quinoline alkaloids of the general structure:

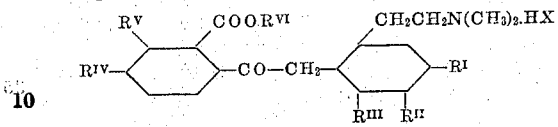

where $R^I$; $R^{II}$; $R^{III}$; $R^{IV}$; and $R^V$ are H, or an alkoxy radical or where adjacent pairs together are an alkylene oxy-radical attached to the benzene nuclei, X is an acid radical, and $R^{VI}$ is an alcohol radical; of the type of narceine and methylhydrasteine, and their substituted derivatives, and to processes for the production of hydrohalides of their alkyl esters generally. Another object is the production of such a series of hydrohaloid salts by direct derivation from narcotine and its analogous alkaloid hydrastine.

The methyl and ethyl esters have previously been prepared by direct esterification of narceine [Freund & Frankforter, Annalen, 277,31 (1893)], but the prior art, so far as revealed by a careful survey of the literature, does not show that any of the higher alkyl esters of narceine or methyl hydrasteine have been produced hitherto and, indeed, it does not appear that any of the processes previously employed for methyl and ethyl esterification of narceine [Freund & Frankforter, Annalen 277,31 (1893)] are suitable for the preparation of the corresponding iso-propyl and butyl esters of narceine or methyl-hydrasteine.

The present process provides a suitable and efficient means for production of hydrohalides of a wide series of alkyl and substituted alkyl esters by application of the new process to the alkaloids, narcotine and hydrastine, instead of by direct esterification of narceine and methyl-hydrasteine, respectively.

In general, the process consists of treating the methyl halides of these alkaloids of the iso-quinoline type by refluxing them with the alcohol required for the specific esterification in the presence of a suitable acid or basic catalyst, as will further hereinafter appear.

The method of employing our process, the resulting reaction, and the type of products obtained are illustrated in the graphic formulae herewith presented:

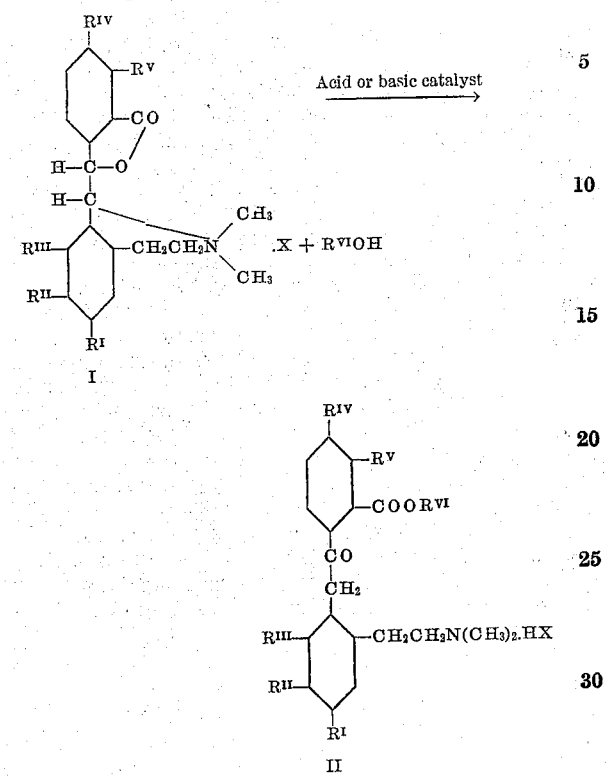

In these formulae $R^I$; $R^{II}$; $R^{III}$; $R^{IV}$; and $R^V$ are H, or an alkoxy radical or where adjacent pairs together are an alkylene oxy-radical attached to the benzene nuclei, X is an acid radical, and $R^{VI}$ is an alcohol radical.

The compounds of Formula I are dissolved in the required alcohol, e. g., ethyl, propyl, iso-propyl, butyl, or amyl. To avoid known side reactions, i. e., the formation of the corresponding free bases and/or amino compounds, the alcohol should preferably contain but little water, say not in excess of about 5%. The solution is refluxed for several hours in the presence of the selected catalyst, which, for obvious reasons, should be substantially anhydrous.

The choice of the catalyst, which may be either acid or basic, will be controlled by considerations as will further appear. It should be an electrolyte which is soluble in the required alcohol for the particular esterification and has a pH substantially between that of sodium ethylate and of salicylic acid in said alcohol.

Among the acids which may be used as catalytic agents are the following:

| Acid | Formula | $K \times 10^{-5}$ |
|---|---|---|
| Boric | $H_3BO_3$ | 0.00007 |
| P-aminobenzoic | $H_2NC_6H_4CO_2H$ | 1.2 |
| Propionic | $CH_3CH_2CO_2H$ | 1.32 |
| Acetic | $CH_3CO_2H$ | 1.85 |
| Cinnamic | $C_6H_5CH=CHCO_2H$ | |
| Phenyl Acetic | $C_6H_5CH_2CO_2H$ | 5.4 |
| Benzoic | $C_6H_5CO_2H$ | 6.52 |
| Salicylic | $HOC_6H_4CO_2H$ | 106.0 |

It has not been found possible, however, to isolate crystalline material in runs made with the following acids as catalysts:

| Acid | Formula | $K \times 10^{-5}$ |
|---|---|---|
| Monochloracetic | $ClCH_2CO_2H$ | 160.0 |
| Oxalic | $(CO_2H)_2$ | 3800.0 |
| Dichloracetic | $Cl_2CHCO_2H$ | 5000.0 |
| Trichloracetic | $Cl_3CCO_2H$ | 300,000.0 |

Such bases may be used as catalytic agents as possess a degree of basicity similar to that existing in the alcoholic solutions containing ammonium, sodium, and potassium ions and also alcoholic solutions of such organic bases as pyridine and quinoline.

For example, ammonia gas (in absolute alcohol); sodium ethylate (in absolute alcohol); sodium acetate (in absolute alcohol); ammonium iodide (in absolute alcohol); potassium iodide (in absolute alcohol); pyridine, and quinoline.

The general applicability of the reactions of the process described was shown by the preparation of various salts of alkyl esters of narceine and methylhydrasteine. Thus, among others, we have produced such compounds as the methyl esters of narceine hydrochloride, hydroiodide, and metho-sulphane; the ethyl esters of narceine hydrochloride and hydroiodide; the propyl, iso-propyl, butyl, and amyl esters of narceine hydroiodide, and hydrochloride; the ethyl ester of methyl-hydrasteine hydrochloride, and the like; as well as corresponding salts of various other substituted alkyl esters of narceine and methyl-hydrasteine.

The process has been applied to the production of the corresponding hydrohalide salts of propyl, iso-propyl, butyl and amyl esters of methyl-hydrasteine.

The following example illustrates the process and general application of the principle and mechanism of the invention to the production of the series described by appropriate adaptation of the required alcohol and catalyst:

EXAMPLE

*Conversion of hydrastine methiodide into the ethyl ester of methyl-hydrasteine hydroiodide*

Hydastine methiodide was refluxed with absolute ethyl alcohol in a stream of ammonia for four hours. The crude crystalline material formed on the concentration of the solution was recrystallized three times from boiling water. It contained halogen and was difficult to burn. The ethyl ester of methyl-hydrasteine hydroiodide was obtained. It occurred in the form of yellow rhomboidal platelets having a melting point of 235–236°.

We claim as our invention:

1. A process for producing alkyl esters of methyl-hydrasteine hydrohalides from hydrastine methyl halides which comprises dissolving hydrastine methyl iodide in substantially absolute alkyl alcohol in the presence of a small amount of a ring-cleavage catalyst comprising an electrolyte soluble in said alcohol and having a pH between that of sodium ethylate and of salicylic acid in said alcohol, and prolonged heating of the mixture over a steam bath.

2. A process for producing the ethyl ester of methyl-hydrasteine hydroiodide from hydrastine methiodide which comprises refluxing hydrastine methiodide with absolute ethyl alcohol in a stream of ammonia, and recrystallizing the reaction product.

3. Salts of alkyl esters of methyl-hydrasteine of the group consisting of hydrohalides and alkyl sulfates.

4. The ethyl ester of methyl-hydrasteine hydriodide of the formula $C_{22}H_{24}(C_2H_5)NO_7HI$, having a melting point of 235–236° C., and occurring in the form of yellow rhomboidal platelets.

5. The ethyl ester of methyl-hydrasteine hydrochloride of the formula $C_{22}H_{24}(C_2H_5)NO_7HCl$, having a melting point of 214–215° C., and occurring in the form of water-white prismatic crystals.

CARL R. ADDINALL.
RANDOLPH T. MAJOR.

CERTIFICATE OF CORRECTION.

Patent No. 2,189,809. February 13, 1940.

CARL R. ADDINALL, ET AL.

It is hereby certified that error appears in the printed specification of the above numbered patent requiring correction as follows: Page 2, first column, line 27, in the table, second column thereof, for "$Cl_2CHO_2H$" read $Cl_2CHCO_2H$;

and that the said Letters Patent should be read with this correction therein that the same may conform to the record of the case in the Patent Office.

Signed and sealed this 30th day of April, A. D. 1940.

(Seal)

Henry Van Arsdale,
Acting Commissioner of Patents.